US012724893B2

(12) United States Patent
Baldwin et al.

(10) Patent No.: US 12,724,893 B2
(45) Date of Patent: Sep. 1, 2026

(54) ANALYSING OPERATING SYSTEM CONFIGURATIONS

(71) Applicants: Peridot Print LLC, Palo Alto, CA (US); NANYANG TECHNOLOGICAL UNIVERSITY, Singapore (SG)

(72) Inventors: Adrian John Baldwin, Bristol (GB); Jonathan Griffin, Bristol (GB); Jakub Pruzinec, Singapore (SG); Quynh Anh Nguyen, Singapore (SG)

(73) Assignees: Peridot Print LLC, Palo Alto, CA (US); NANYANG TECHNOLOGICAL UNIVERSITY, Singapore (SG)

( * ) Notice: Subject to any disclaimer, the term of this patent is extended or adjusted under 35 U.S.C. 154(b) by 218 days.

(21) Appl. No.: 18/567,308

(22) PCT Filed: Jun. 9, 2021

(86) PCT No.: PCT/US2021/036563

§ 371 (c)(1),
(2) Date: Dec. 5, 2023

(87) PCT Pub. No.: WO2022/260663

PCT Pub. Date: Dec. 15, 2022

(65) Prior Publication Data

US 2024/0281532 A1 Aug. 22, 2024

(51) Int. Cl.
*G06F 21/56* (2013.01)
*G06F 21/10* (2013.01)
(Continued)

(52) U.S. Cl.
CPC .......... *G06F 21/566* (2013.01); *G06F 21/126* (2013.01); *G06F 21/1064* (2023.08); *G06F 21/50* (2013.01); *G06F 21/56* (2013.01)

(58) Field of Classification Search
CPC .. G06F 21/566; G06F 21/1064; G06F 21/126; G06F 21/50; G06F 21/56; G06F 21/12; G06F 21/10
See application file for complete search history.

(56) References Cited

U.S. PATENT DOCUMENTS 10,289,841 B2 5/2019 Tang et al.
10,880,316 B2 * 12/2020 Pal ........................ G06F 9/4484
(Continued)

FOREIGN PATENT DOCUMENTS

CA 3020559 C * 6/2024 ............ G06F 11/302
WO WO-2017151515 A1 * 9/2017 ........... G06F 18/241
WO WO-2021177989 A1 * 9/2021 ........... H04L 63/145

OTHER PUBLICATIONS

Keshavarzi, M., et al., "I2CE3: A dedicated and separated attack chain for ransomware offenses as the most infamous cyber extortion," Computer Science Review, vol. 36, May 2020, pp. 100233.
(Continued)

*Primary Examiner* — Jayesh M Jhaveri
(74) *Attorney, Agent, or Firm* — Michael Dryja

(57) ABSTRACT

At least in some examples, a non-transitory machine-readable storage medium can be encoded with instructions for analysing an operating system configuration, the instructions executable by a processor of a system, whereby to cause the system to generate a set of malware samples, each malware sample defined by a set of actions forming an attack chain representing a sequence of procedures, execute each of the malware samples on an instance of the operating system configuration to generate a set of logs, and using the set of logs, determine a set of actions detected by an anti-malware process of the operating system configuration.

19 Claims, 4 Drawing Sheets

(51) Int. Cl.
*G06F 21/12* (2013.01)
*G06F 21/50* (2013.01)

(56) References Cited

U.S. PATENT DOCUMENTS

| | | | | |
|---|---|---|---|---|
| 2017/0228542 | A1 | 8/2017 | Langton et al. | |
| 2018/0012021 | A1 | 1/2018 | Volkov | |
| 2019/0073474 | A1 | 3/2019 | Zhang et al. | |
| 2019/0138714 | A1* | 5/2019 | Lu | G06F 21/566 |
| 2020/0074080 | A1 | 3/2020 | Srinivasagopalan et al. | |
| 2020/0125728 | A1 | 4/2020 | Savir et al. | |
| 2022/0035920 | A1* | 2/2022 | Thomas | G06F 21/566 |

OTHER PUBLICATIONS

Zhang, H., et al., "A Multi-Step Attack Detection Model Based on Alerts of Smart Grid Monitoring System," IEEE Access, vol. 8, Dec. 23, 2019, pp. 1031-1047.

Zhang, H., et al., "MALDC: a depth detection method for malware based on behavior chains," World Wide Web, vol. 23, Issue 2, Mar. 2020, pp. 991-1010.

* cited by examiner

ANALYSING OPERATING SYSTEM CONFIGURATIONS

BACKGROUND

Anti-Virus (AV) and End Point Detection (EDR) systems can be used as security controls and protective systems to detect and defend against attacks and malware targeting one or more devices in an environment, such as an enterprise environment for example. However, the efficacy of such systems can be difficult to assess.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION

Figure 1:
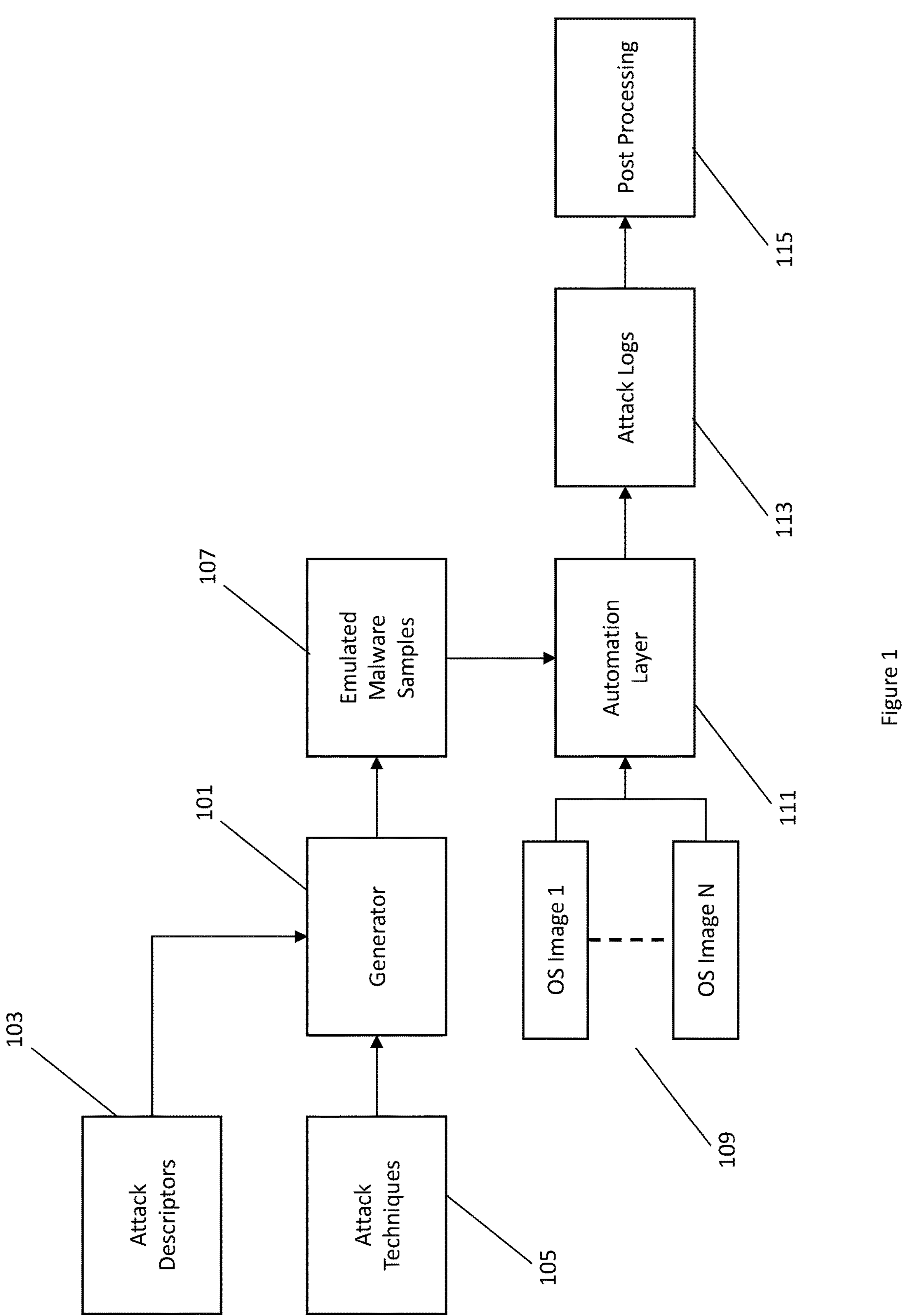
FIG. 1 is a schematic representation of a system according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein. As used herein, the term technique comprises an action or procedure that is used as part of a process to achieve a certain objective or tactic.

In order to avoid and bypass defensive systems attackers will often vary the underlying instructions of malicious packages ('malware'). In response, a variety of defences and systems, e.g., AV systems, can comprise a range of defences from signature-based detection mechanisms, which detect similarities in code between malware families, including new variants, through to behavioural detection systems that are used to detect commonly used malware techniques in an attempt to thwart efforts to bypass the systems. Such behavioural detection systems can examine the dynamic behaviour of executing instructions in order to detect when common malware techniques are used; they can then terminate the malicious processes to prevent harm. This approach helps to detect and stop malware that is not detected by a signature detection process for example. In addition, various operating system configurations and other protections exist that can block attack techniques.

In order to assess the effectiveness of detection and protection systems, recent malware samples can be used to determine how well such systems respond when exposed to the malware. However, more sophisticated attackers will craft or modify attacks that avoid prevailing detection mechanisms. For example, cryptors, polymorphic, oligomorphic, or metamorphic techniques can be used to encrypt and morph malware instructions in order to avoid detection. In addition, malware writers will often test their malware against multiple AV systems to check whether it evades detection of a sufficient set of AVs prior to releasing it.

Although malware and attacks change in the details of the instructions and executables, they are nearly always built as combinations of well-known attack actions or techniques that are commonly published by malware analysts. For a give tactic (the objective of the malware) there can be a choice of different actions, techniques or procedures. Therefore, although developing new attack techniques is difficult, it is common for combinations of pre-existing techniques to be used to form modified versions of existing attacks. Even when new techniques are developed malware can be constructed from multiple techniques and can still contain multiple known techniques. For example, malware components that can be modified in an attempt to circumvent an AV/EDR system include: components to control the speed and pattern of beaconing back to a command-and-control server, components to modify a process into which malware instructions are injected, and components to change the name (or generation function) for mutexes used. In addition, the placement of components in the form of actions, procedures etc. in an attack chain can be varied. That is, the order of execution of components in a piece of malware comprising multiple components can be varied. Accordingly, two pieces of malware may have the same overarching objective but may have different attack chains. That is, they may differ in the order of execution of individual components. For example, a first malware may have an attack chain composed of four components (a, b, c, d) that are executed in that order, with the possibility that a succeeding component in the attack chain receives data from or is dependent on completion of a preceding component in the attack chain. For example, component b may receive data from component a and/or may be dependent on the completion of component a. A second malware, with the same objective as the first (e.g., input capture) may have an attack chain composed of the same four individual components but which are arranged and executed in the order (b, c, a, d). Because of the difference, the second malware attack may succeed in its ultimate objective whereas the first failed as it was detected during execution because, for example, the technique of component a passing data to component b was recognised as belonging to a known attack.

A set of tactics, e.g., x, y, z can be implemented using a set of techniques and/or procedures that help achieve the tactic. There may be a set of 10 different ways of achieving a tactic (e.g., privilege escalation), a1 to a10. Therefore, for the tactic one or more of a1 to a10 can be selected.

Accordingly, adversarial attacks are usually carried out in multiple steps, e.g., to steal credentials, an attacker could exploit a target machine, escalate their privileges, search for available credentials and ex-filtrate them via the internet. The individual steps are referred to as Tactics, Techniques, and Procedures (TTPs). A knowledge base of adversary tactics and techniques based on real-world observations is provided in, e.g., the Mitre Att&ck framework (https://attack.mitre.org/matrices/enterprise/windows/).

In an example, a tactic describes a purpose of some action and how it supports a strategic goal; a technique is a possible method of executing a tactic; a procedure or action is a particular implementation of a technique. Generally, there may be several techniques that realize a tactic. For example, both Exploitation and Process Injection may execute the same tactic, e.g., Privilege Escalation. For example, the tactic 'privilege escalation' could be achieved using techniques such as Access Token Manipulation, Domain Policy Modification, Process Injection etc. Each of these techniques may have multiple actions or procedures to implement them; for example, access token manipulation could be achieved through several procedures (including impersonation token, getting debug privileges or invoke-tokenManipulation). A different tactic such as defence evasion would have a different set of techniques and corresponding procedures such as File and Directory Permissions Modification, Registry Modification, Masquerading. Some techniques such as process injection can help with multiple tactics (privilege escalation and defence evasion).

Accordingly, a technique can be implemented by a variety of actions or procedures due to the many technical options a programmer has to achieve desired functionality. As an example, an attacker can use different standard API calls to inject payload into a process. A sequence of TTPs form an attack chain and can take the form of malware or an attack that is actively controlled by an attacker. In an example, an attack chain comprises one or more actions or procedures that can be executed to achieve a tactic or overarching goal. That is, e.g., a set of actions or procedures that operate in a given manner and/or in succession form an attack chain.

It can be difficult for an enterprise to know and understand how effective its protections are, particularly against new attacks which may be based on modifications of existing ones as described above. In some cases, assessing the security posture of an enterprise against new attacks can rely on experts (pen testers) who will use a variety of tools to attack systems. Such testing is often concentrated on the overall IT infrastructure of an enterprise rather than just an assessment of endpoint configuration and security (which is often managed by different teams).

However, this will provide little insight into the likelihood that an attacker or malware writer can construct an attack that not only evades signature detection but also behavioural detection, or whether a particular attack group's favourite attack techniques will be detected and blocked. In other words, it can be hard to get a good understanding of which attack techniques or combinations of techniques will be detected and hence which attacks are terminated.

According to an example, there is provided a system for wide scale automated testing of endpoint systems against sets of documented attack techniques and variants of these techniques enabling a comparative analysis of different AV choices and protection settings/mechanisms.

One or more candidate operating system (OS) images with appropriately secured configurations and AV systems and other security systems installed can be generated or provided. A set of emulated malware is generated or configured and executed against a clean image of each candidate OS image. Detection results can be recorded along with the result of logging from the emulated sample. In an example, a detection can occur when, e.g., an AV product flags that it has detected the emulated malware sample, and logging from the emulated sample can provide an indication of how far along an attack chain a malware sample reached before it was stopped (or whether it ran to completion). An evaluator can report on which combinations of techniques are detected or not, whereby to enable a comparison of the different systems to be made so that a determination as to which behaviours are missed and which are detected. This can allow an assessment of the different choices of security controls to be made.

It is therefore possible to assess which attack paths are blocked (i.e., their use is detected, and/or malware is terminated) and which remain open by systematically generating emulated malware samples (each using a range of known attack techniques) that are ordered and organized in the form of an attack chain. For example, some techniques may not work due to their configuration so the emulated malware fails (as it uses a typical rather than a secure configuration) or it can be the case that an AV system detects something but fails to terminate the malware sample, which can result in the malware sample spreading over multiple processes.

FIG. 1 is a schematic representation of a system according to an example. A malware generator 101 takes a set of attack specifications or descriptors 103 representing an attack space to be explored along with a set of modules 105 that describe and implement various attack techniques. In an example, a combination of attack techniques 105 forms an attack chain. An attack chain can be configured according to an attack specification to achieve a certain objective or tactic. The techniques can be parameterised such that a range of predictable variants of any technique can be selected and combined into emulated malware samples 107. This enables a known technique space to be covered and also enables extension into a technique space comprising otherwise unknown combinations of techniques.

So, for example, in the case of a set of tactics, the malware generator 101 can receive an attack description that could be in the form of, e.g., Tactic1—use actions/techniques (a, b, c, none)

Tactic 2—use actions/techniques (e, f, g)

Tactic 3—use actions/techniques (h, b, I, j, k)

and so on.

The malware generator 101 can then generate multiple malware samples from the possible combinations of actions or techniques relating to the tactics, such as:

$$a -> e -> h ->$$

$$e -> j ->$$

$$c -> g -> k ->$$

and so on.

Multiple actions or techniques can also be used for a given tactic, e.g., $$a \to e \to f \to b \to$$

$$a \to g \to i \to k \to$$

and so on.

Hence given a set of actions or techniques being implemented a large number of emulated malware samples can be generated.

In terms of parameterization, a tactic could, for example, be parameterised as follows:

Tactic 1—using (a, b(<1 . . . n>), c)

And so on as a list where b is parameterized with a value of 1 . . . n which could, for example, represent a speed between command and control calls, or the delay between different API calls in performing a task and so on.

In an example, chains can be provided, such as, e.g., $$b(1) \to f \to h$$

$$b(23) \to f \to h$$

and these can be slightly different attack chains and hence detection could be different.

According to an example, a set of OS images 109 is generated, used or provided. Each image 109 can comprise different defences, such as different AV and/or EDR systems for example. Accordingly, a space of OS images 109 is provided that covers multiple variants of an OS, e.g., with respective different security settings, such as, for example, with certain protocols enabled/disabled, particular firewall rules, different protections on document folders (controlled access folders), credential guard and so on. Variants of an OS can also comprise OS versions having different patch levels or comprising different versions. The OS variants can comprise multiple different defence variants, such as different AV/EDR systems (e.g., different AV/EDR systems from different vendors, different AV/EDR settings and/or updates and so on). Thus, a set of attacks comprising the malware samples 107 can be tested against a number of OS images 109 where each image can have different defences including different AV systems.

According to an example, an automation layer 111 executes each image from the set of OS images 109 in, e.g., a fresh or new virtual machine and executes the samples 107 thereon. For example, for each OS image (109) the automation layer 111 can:

1) Instantiate a clean VM with an OS instance forming a snapshot VM
2) For each emulated sample (attack chain)
   a. Start the VM
   b. run one sample
   c. record results
   d. Reset VM to snapshot Thus, in an example, each sample runs in a clean VM (i.e., the snapshot). Therefore, one sample will not interfere with the detection of a second sample.

Results from execution of the samples 107 across the OS images 109 can be recorded as a set of attack logs 113 comprising logs created by the emulated malware samples 107 in question and reports made by, e.g., an AV and/or EDR system of an OS image. In an example, logs and reports can be stored in a database and processed afterwards in post processing 115 where attack chains which were detected and which ran successfully can be evaluated. This provides information to an enterprise as to which attack paths remain exploitable and how this varies across different systems. In an example, successful execution of an attack chain can be detected by a malware sample performing an action or task, such as opening a predefined port on an apparatus for example.

Figure 2:
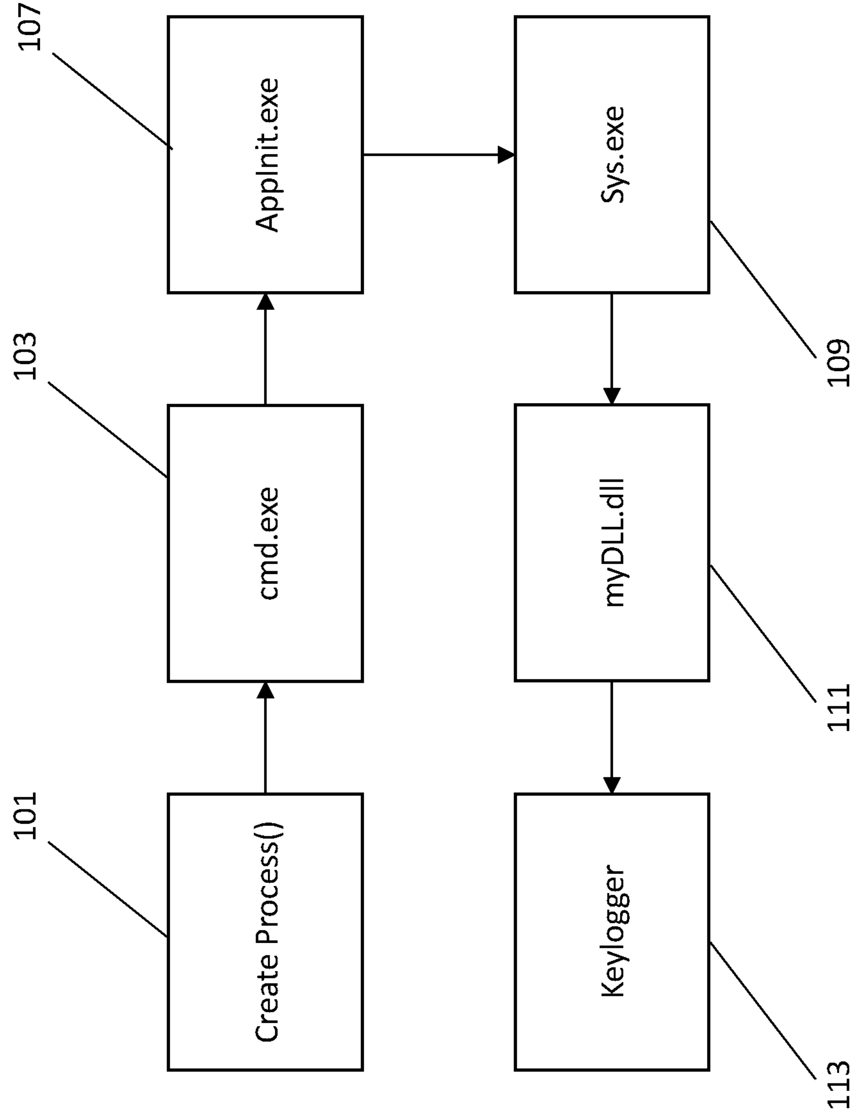
FIG. 2 is a schematic representation of operation of a malware sample according to an example.

FIG. 2 is a schematic representation of operation of an exemplary malware sample according to an example. In the example of FIG. 2, individual parts of a malware attack are depicted. Each part may comprise part of an attack chain of the malware attack for example, which starts with creation of a command line process 101, 103 that invokes an executable Applnit.exe 107. The executable Applnit.exe 107 registers an arbitrary dynamic linked library (DLL) myDLL.dll 111 via a system process executable sys.exe 109 that can be loaded by any process that loads user32.dll, which implements a user component that creates and manipulates the standard elements of an OS user interface, such as the desktop, windows, and menus for example. Once loaded by a system process, the DLL can launch a keylogger 113. In the example of FIG. 2, a path to the command line executable 103 is a hard-coded parameter to CreateProcess( ) function 101, Applnit.exe 107 is launched by a hardcoded command and there is a hard-coded invocation of a keylogger in myDLL.dll. Previous threat emulators implement individual attack steps as disjoint adversarial procedures because it is challenging for emulators is to link these procedures to an attack chain (something a malware writer naturally does as they hard-code procedure as a sequence).

Another disadvantage of emulation agents is the use of central executables that invoke individual procedures from a single source. As a result, the procedures do not share contextual information and the emulated attack is semantically incoherent. In the example of FIG. 2, an agent or a central executable would first call CreateProcess( ) 101 to spawn a console 103 and then it would launch Applnit.exe 107. This way, AppInit.exe 107 would run in the context of the agent or central executable instead of the spawned console. It is particularly problematic as malware often operates by inserting itself into other processes which is hard to emulate with centralized execution, yet important as malware behaviour.

According to an example, generating a malware sample can starts with a specification of an attack chain. The desired procedures can then be selected from the actions or techniques 105 and their parameters can be defined, such as in a JavaScript Object Notation (JSON) file for example. The choice, order and number of TTPs can be arbitrary and they can repeat. For example, a user can compose an attack chain from Execution, Credential Access, and Exfiltration tactics. Actions such as Execution Though API, Credential Dumping, and Data Compressed can be chosen for each specified tactic. The desired procedures such as Create Process, SAM Registry Keys Dumping, and Zip implementing the techniques can be selected. The scripts/executables of the specified procedures can be determined from the procedure library 105 and copied to a final malware sample. In an example, generated malware can be represented by a set of scripts/executables as opposed to a single-piece unit. Furthermore, an environment file for attack coordination can be generated. There are no restrictions regarding which procedures can be combined and therefore a large attack space can be covered.

According to an example, emulated samples 107 are decentralized. As such, procedures of a malware sample update themselves and distribute coordination data, which can comprise information about the currently running procedure and information about the whole attack chain. In an example, attack coordination can be realized as follows:

1) Coordination data about the whole attack chain can be loaded from a generated environment file by a bootstrap script.
2) The bootstrap script updates the pointer to the currently running procedure to point to the entry point script/executable of the first procedure.
3) The script directly invokes the first procedure and passes on the coordination data. At this point, the execution flow has been fully passed to the first procedure and the bootstrap script stops.
4) The first procedure conducts its adversarial activities and when done, it updates the pointer to the currently running procedure to point to the succeeding one. Afterwards, it directly invokes the following procedure and stops. This process is repeated until the whole attack chain finishes.

Direct invocation of the procedures is possible because the locations of entry point scripts are known during the time of invocation. In an example, the coordination data is stored in environment variables. Environment variables can comprise: permanent, procedural and current variables. Permanent variables hold fixed values, such as the specification of the attack chain, procedural variables carry information specific to a procedure, e.g., a path to their entry point script/executable along with any procedure parameters previously defined in the specification JSON file, and current variables point to procedural variables of the currently running procedure. Procedures can be linked by updating the current variables to point to procedural variables of the target procedure followed by a direct invocation.

Any two procedures can be linked together, however their file formats can differ. As a result, there is no uniform invocation method to cover all of them. Consider the example in FIG. 2. The AppInit technique uses the injected code in the form of a DLL, but the following procedure, Keylogger, can be implemented as a PowerShell script or a binary executable. Consequently, the DLL does not hardcode a function to invoke the following procedure. To address this, information about file formats can be stored in procedure variables and the invocation method can be chosen dynamically. Table I below shows which invocation method is chosen depending on the various formats according to an example.

| Caller | Callee | Method |
|---|---|---|
| Exe | Exe | system(<next>) |
| Exe | PS | system("powershell <next>") |
| PS | Exe | &[2]<next> |
| PS | PS | powershell <next> |

Figure 3:
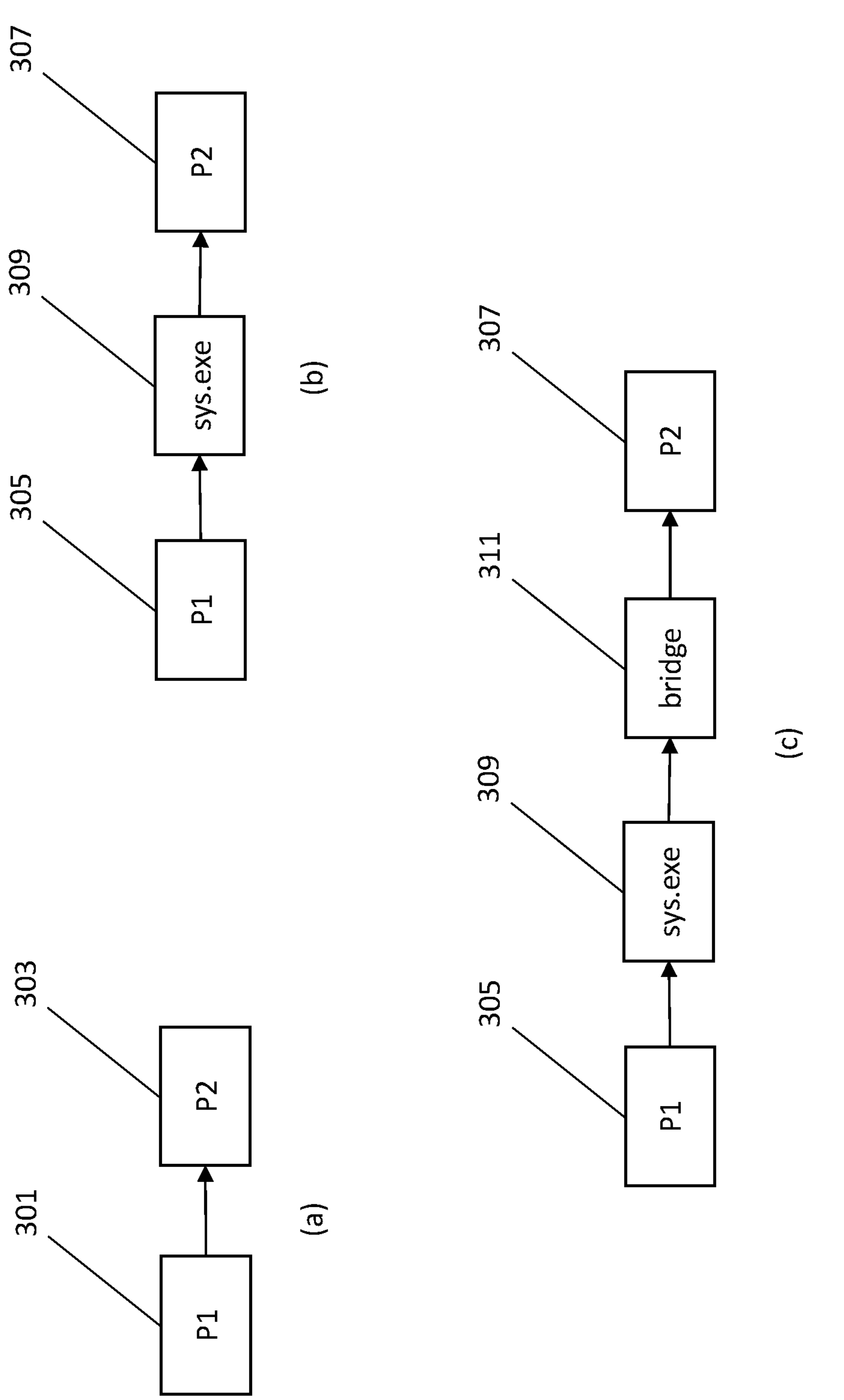
FIG. 3 is a schematic representation of several ways of invocation emulating different ways of malware operation according to an example.

FIG. 3 is a schematic representation of several ways of invocation emulating different ways of malware operation according to an example. As depicted in FIG. 3, there are multiple ways an execution can be passed to the following procedure in an attack chain. For example, with reference to FIG. 3*a*, procedures can be invoked as child processes, such that procedure P2 301 is invoked as a child process of procedure P1 303 for example.

In the example of FIG. 3*b*, the execution flow from procedure P1 305 to procedure P2 307 is mediated through an external process 309 (sys.exe). However, some hijacked processes or services can invoke scripts/executables of a certain file format that may or may not match the format of the subsequent procedure. Therefore, in an example, a bridge 311 with a file format matching that of the subsequent procedure 307 can be inserted in between the hijacked process 305 and the following procedure 307

In the examples of FIG. 3, the procedures pass on coordination information to their successors. Where a procedure directly invokes another as child processes (FIG. 3*a*) this happens implicitly with environment variables being copied upon process instantiation. However, breaks in the execution flow (as in FIGS. 3*b* and 3*c* for example) can result in a loss of the environment. Referring to FIG. 2, myDLL.dll 111 is loaded into an already running system process and the environment variables are lost. Therefore, according to an example, a bridge 311 can reset the environment variables using an environment file.

Figure 4:
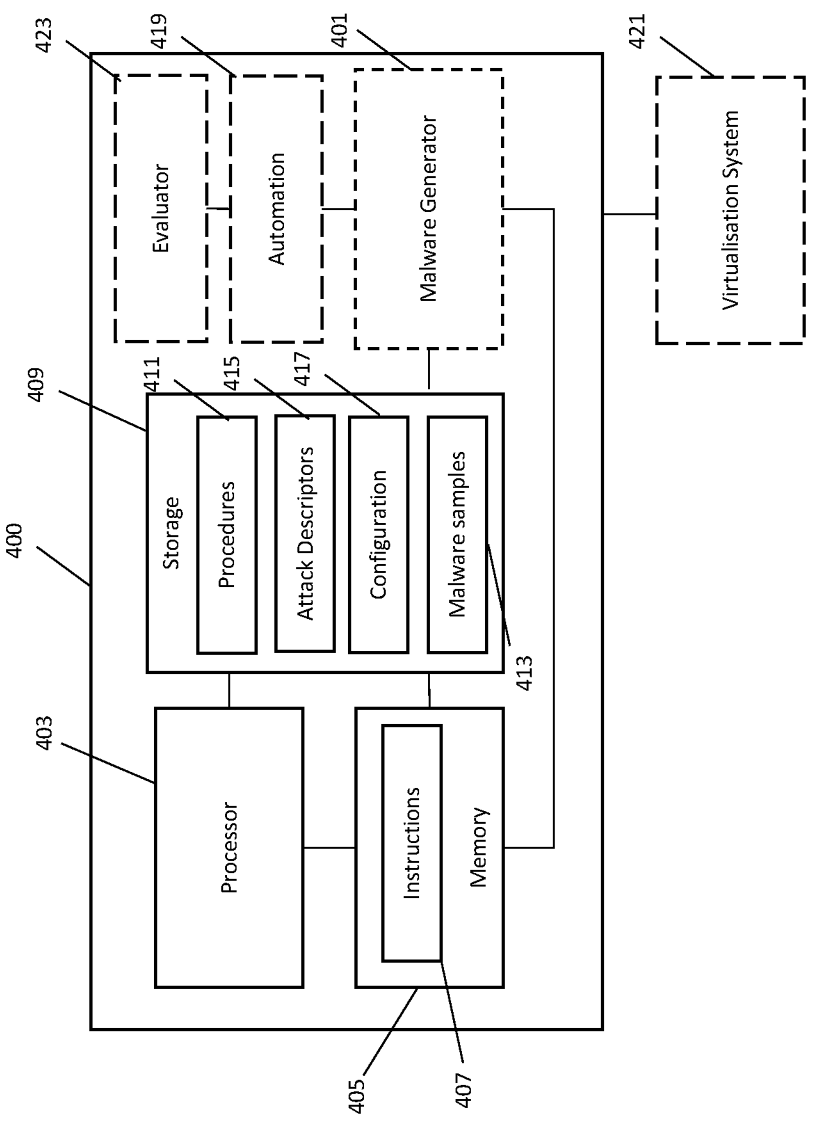
FIG. 4 is a schematic representation of an apparatus according to an example.

FIG. 4 is a schematic representation of an apparatus according to an example. The apparatus 400 comprises a processor 403, and a memory 405 comprising instructions 407. A storage 409 comprises data defining a set of procedures 411 forming attack actions or techniques, each defining a building block of an attach chain for example. The processor 403 is configured to execute the instructions 407 to generate a set of malware samples 413, each malware sample comprising a sequence of procedures from the set of procedures 411 and forming an attack chain corresponding to a preselected configuration 415.

Malware generator 401 can be implemented by processor 403 executing machine readable instructions 407 stored in memory 405. Accordingly, malware generator takes as input a set of procedures or modules 411 implementing a set of the attack actions or techniques and labelled according to a malware taxonomy. These modules can be parameterized as described above. A configuration file 417 can be input into the malware generator 401 to enable selection of which actions (and associated stages in an attack chain) should be used in generating a set of emulated malware samples 413. These descriptions can include a range of parameters for a given module 411 which enables the behaviour of the attack technique to be varied. For example, configuration 417 can comprise a library of suitable scripts, for example, covering attack techniques or a script covering techniques used by a particular threat actor or recent techniques.

The malware generator 401 uses the description along with the attack modules 411 to generate the set of malware samples 413. The malware samples 413 can include instructions for logging as each attack technique is completed. Automation layer or function 419 can be implemented by processor 403 executing machine readable instructions 407 stored in memory 405. In an example, automation layer 419 uses each of the set of OS images 109 in turn to execute all the samples 413 against the OS image and can record the results for each of the samples (including, e.g., how far they ran and whether they ran to completion). In an example, a virtualization system 421 can be used to execute an OS image 109 and malware sample. A new instantiation of the OS image in question is used for each malware sample. Thus, for each sample and each OS a clone of the OS image can be generated in system 421 into which a sample is executed (this may include multiple reboots etc.). The results of execution of a malware sample 413 in an instantiation of an OS image 109 can be stored in the form of logs 113. These logs can include detection logs from any AV systems (for example gathered through the Windows Log system) as well as log files generated by the samples themselves. Therefore, according to an example, each malware sample 413 is applied to an instance of an operating system configuration 109 to generate log data 113 comprising output data from at least one of a malware sample and an anti-malware process of the operating system configuration.

In an example, a test can be performed to place a malware sample on a system (i.e., an OS image) without actively running the techniques to test for static detection of the code.

An evaluator module 423, which can be implemented by processor 403 executing machine readable instructions 407 stored in memory 405, can be used to parse the logs 113 and select which attack techniques are consistently detected. For example, those that are detected as part of a chain of techniques and those techniques that are consistently missed can be selected. That is, using the log data, a set of actions detected by an anti-malware process of an operating system configuration can be determined.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, user equipment such as a smart device, e.g., a smart phone, a special purpose computer, an embedded processor or processors of other programmable data processing devices to realize the functions described in the description and diagrams. In particular, a processor or processing apparatus may execute the machine-readable instructions. Thus, modules of apparatus (for example, a modules implementing functions 401, 419, 423) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer or software product, such as a non-transitory machine-readable storage medium, the computer software or product being stored in a storage medium and comprising a plurality of instructions, e.g., machine readable instructions, for making a computer device implement the methods recited in the examples of the present disclosure.

In some examples, some methods can be performed in a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. In addition, one or more of the modules described herein may transform data, physical devices, and/or representations of physical devices from one form to another.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The invention claimed is:

1. A non-transitory machine-readable storage medium storing instructions executable by a processor of a system to cause the system to perform processing comprising:

generating a plurality of malware samples based on a plurality of modules and a plurality of attack descriptors, wherein the modules respectively describe and implement a plurality of known attack techniques, and each attack descriptor, of the plurality of attack descriptors, defines a sequence of attack tactics, where each attack tactic in the sequence is one of the known attack techniques described and implemented by the modules;

executing each malware sample, of the plurality of malware samples, on one or more instances of an operating system configuration to generate a plurality of logs; and using the plurality of logs, determining a plurality of actions detected by an anti-malware process of the operating system configuration.

2. The non-transitory machine-readable storage medium of claim 1, wherein the processing further comprises:

generating a plurality of the instances of the operating system configuration, each instance comprising a different operating system variant.

3. The non-transitory machine-readable storage medium of claim 2, wherein executing each malware sample comprises:

generating each malware sample on each instance of the operating system configuration.

4. The non-transitory machine-readable storage medium of claim 2, wherein at least one of the instances of the operating system configuration comprises an antivirus system.

5. The non-transitory machine-readable storage medium of claim 2, wherein at least some of the instances of the operating system configuration have respective different security configurations.

6. The non-transitory machine-readable storage medium of claim 1, wherein determining the actions comprises:

detecting which of the malware samples have successfully executed on the instances of the operating system configuration.

7. The non-transitory machine-readable storage medium of claim 1, wherein generating the malware samples based on the modules and the attack descriptors comprises, for each attack descriptor:

instantiating one or more instances of the sequence of attack tactics defined by the attack descriptor, as one or more of the malware samples.

8. The non-transitory machine-readable storage medium of claim 7, wherein, for each attack descriptor, each attack tactic in the sequence is defined by the attack descriptor as being selectable from a specified sub-plurality of the known attack techniques.

9. The non-transitory machine-readable storage medium of claim 8, wherein instantiating the one or more instances of the sequence of attack tactics comprises, for each instance, selecting, for each attack tactic defined by the attack descriptor, one of the specified sub-plurality of the known attack techniques defined by the attack descriptor for the attack tactic, such that the instance of the sequence is a particular sequence of the known attack techniques described and implemented by the modules.

10. The non-transitory machine-readable storage medium of claim 9, wherein, for each of at least one of the attack descriptors, each of a sub-plurality of the attack tactics in the sequence is further defined by the attack descriptor as having a parameter within a parameter range.

11. The non-transitory machine-readable storage medium of claim 10, wherein instantiating the one or more instances of the sequence of attack tactics further comprises, for each instance, selecting, for each attack tactic in the sub-plurality of the attack tactics, the parameter within the parameter range, such that the instance of the sequence further includes the parameter selected for each attack tactic in the sub-plurality.

12. An apparatus comprising:

a processor;

a storage device storing a plurality of modules and a plurality of attack descriptors, wherein the modules respectively describe and implement a plurality of known attack techniques, and each attack descriptor, of the plurality of attack descriptors, defines a sequence of attack tactics, where each attack tactic in the sequence is one of the known attack techniques described and implemented by the modules;

a memory storing instructions executable by the processor to perform processing comprising:

generating a plurality of malware samples based on the modules and the attack descriptors;

executing each malware sample, of the plurality of malware samples, on one or more instances of an operating system configuration to generate a plurality of logs; and using the plurality of logs, detecting which of the malware samples have successfully executed on the instances of the operating system configuration.

13. The apparatus of claim 12, wherein generating the malware samples based on the modules and the attack descriptors comprises, for each attack descriptor:

instantiating one or more instances of the sequence of attack tactics defined by the attack descriptor, as one or more of the malware samples.

14. The apparatus of claim 13, wherein, for each attack descriptor, each attack tactic in the sequence is defined by the attack descriptor as being selectable from a specified sub-plurality of the known attack techniques, and wherein instantiating the one or more instances of the sequence of attack tactics comprises, for each instance, selecting, for each attack tactic defined by the attack descriptor, one of the specified sub-plurality of the known attack techniques defined by the attack descriptor for the attack tactic, such that the instance of the sequence is a particular sequence of the known attack techniques described and implemented by the modules.

15. The apparatus of claim 14, wherein, for each of at least one of the attack descriptors, each of a sub-plurality of the attack tactics in the sequence is further defined by the attack descriptor as having a parameter within a parameter range, and wherein instantiating the one or more instances of the sequence of attack tactics further comprises, for each instance, selecting, for each attack tactic in the sub-plurality of the attack tactics, the parameter within the parameter range, such that the instance of the sequence further includes the parameter selected for each attack tactic in the sub-plurality.

16. A method comprising:

generating, by a processor, a plurality of malware samples based on a plurality of modules and a plurality of attack descriptors, wherein the modules respectively describe and implement a plurality of known attack techniques, and each attack descriptor, of the plurality of attack descriptors, defines a sequence of attack tactics, where each attack tactic in the sequence is one of the known attack techniques described and implemented by the modules;

executing, by the processor, each malware sample, of the plurality of malware samples, on one or more instances of an operating system configuration to generate a plurality of logs; and using the plurality of logs, detecting, by the processor, which of the malware samples have successfully executed on the instances of the operating system configuration.

17. The method of claim 16, wherein generating the malware samples based on the modules and the attack descriptors comprises, for each attack descriptor:

instantiating one or more instances of the sequence of attack tactics defined by the attack descriptor, as one or more of the malware samples.

18. The method of claim 17, wherein, for each attack descriptor, each attack tactic in the sequence is defined by the attack descriptor as being selectable from a specified sub-plurality of the known attack techniques, and wherein instantiating the one or more instances of the sequence of attack tactics comprises, for each instance, selecting, for each attack tactic defined by the attack descriptor, one of the specified sub-plurality of the known attack techniques defined by the attack descriptor for the attack tactic, such that the instance of the sequence is a particular sequence of the known attack techniques described and implemented by the modules.

19. The method of claim 18, wherein, for each of at least one of the attack descriptors, each of a sub-plurality of the attack tactics in the sequence is further defined by the attack descriptor as having a parameter within a parameter range, and wherein instantiating the one or more instances of the sequence of attack tactics further comprises, for each instance, selecting, for each attack tactic in the sub-plurality of the attack tactics, the parameter within the parameter range, such that the instance of the sequence further includes the parameter selected for each attack tactic in the sub-plurality.

* * * * *